United States Patent Office.

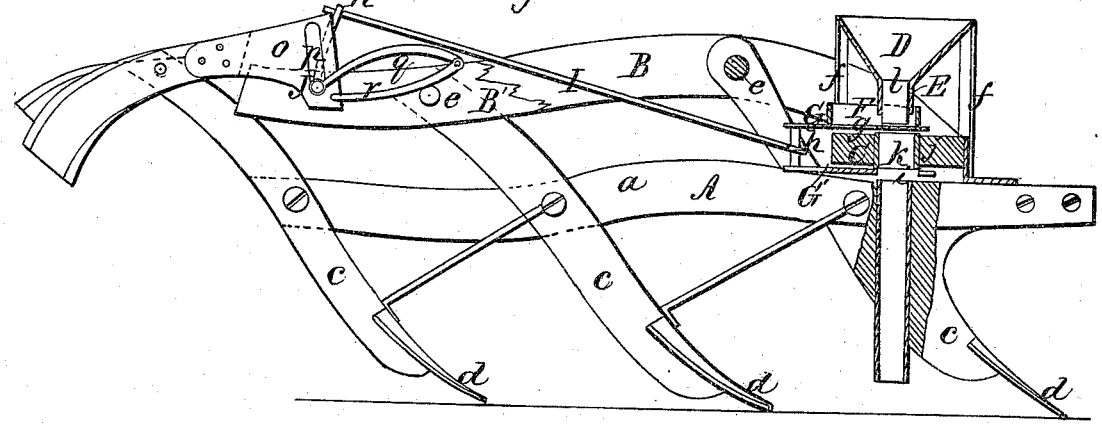
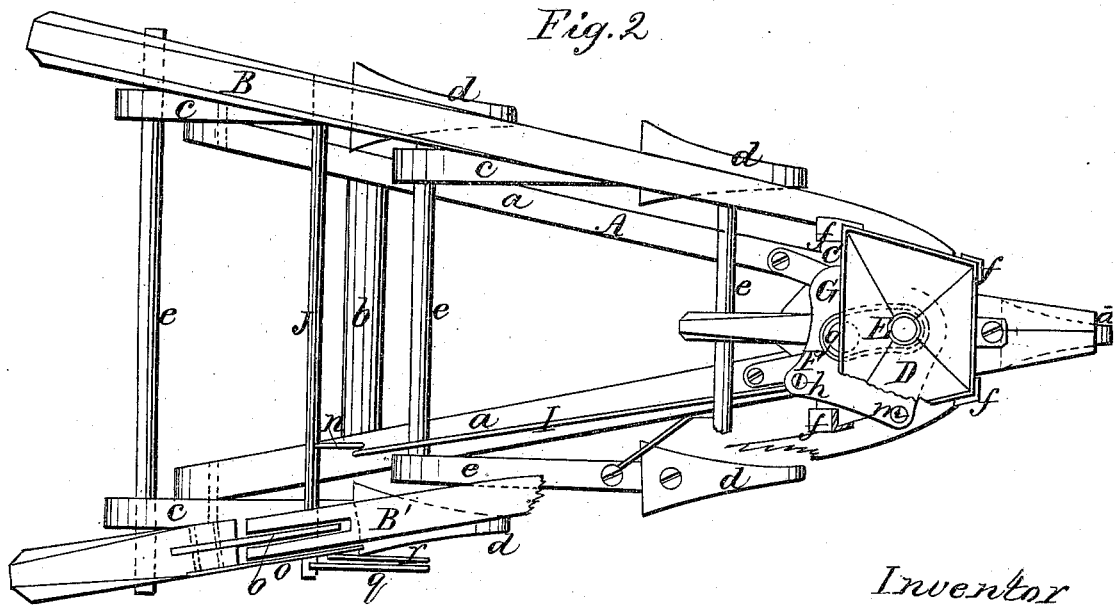

D. B. MORGAN, OF WASHINGTON, OHIO, ASSIGNOR TO HIMSELF AND MOSES GILMORE, OF THE SAME PLACE.

Letters Patent No. 86,776, dated February 9, 1869.

IMPROVEMENT IN CULTIVATOR AND SEED-PLANTER.

The Schedule referred to in these Letters Patent and making part of the same.

*To all whom it may concern:*

Be it known that I, D. B. MORGAN, of Washington, in the county of Fayette, and State of Ohio, have invented a new and useful Improvement in Cultivators and Seed-Planters; and I do hereby declare that the following is a full, clear, and exact description thereof, which will enable others skilled in the art to make and use the same, reference being had to the accompanying drawings, forming part of this specification, in which—

Figure 1 is a side view of my invention, partly in section.

Figure 2 is a plan or top view of the same.

Similar letters of reference indicate like parts.

This invention relates to a new and improved cultivator and seed-planter; and consists in a novel construction and arrangement of parts, as hereinafter fully shown and described, whereby the seed-dropping may be operated with the greatest facility by the driver, or person having hold of the handles of the implement.

The invention also consists in a novel seed-dropping device, as hereinafter fully shown and described, whereby the seed is dropped with certainty, and in a proper manner, about an equal amount of seed being in each dropping.

The invention further consists in a novel construction and arrangement of the cultivator-teeth, as hereinafter fully shown and described, whereby the earth will be thoroughly pulverized, and rendered light and pliable.

In the accompanying sheet of drawings—

A represents the main frame of the machine, which is composed of two bars, *a a*, placed in V-form, and connected by cross-rods *b*.

To these bars *a a* standards *c* are attached, two at each side, and one in the angle at the front of the frame, said standards having an inclined position, as shown in fig. 1, and each having a plow, or share, *d*, attached to its lower end.

These plows, or shares, are quite long, and gradually taper, or decrease in width, from their upper to their lower ends, so that they may penetrate the earth freely, and leave it light and pliable. The shape of the plows or shares is shown clearly in fig. 2.

B B' represent the handles of the device, which are secured in position by cross-rods, *e*, which pass through the upper ends of the standards *c*.

Between the front ends of the handles B B' a block, C, is permanently secured, which has an upright, *f*, at each corner, to support a hopper, D, in which the seed to be dropped is placed, said hopper being provided with a pendent tube, E, through which the seed passes down into an oblong cup, F, on the top of a plate, G.

This cup F has a circular hole, *g*, through its bottom, and the plate G is connected, by uprights, *h*, to a plate, G', which is precisely similar to G, and is underneath the block C.

This plate G' has a circular opening, *i'*, made in it, out of line with the hole *g* in G, and the block C has a circular hole, *j*, made centrally through it, which is in line with the tube E of the hopper D.

The hole *j* in the block C is lined with an India-rubber tube, *k*, and the tube E is lined with a tube, *l*, like *k*; the upper plate G, therefore, works between the tubes *k l*, and as the holes *g i* are out of line with each other, the lower plate, G', closes the lower end of tube *k* when its upper end is open, and when the upper end of *k* is closed, and also the lower end of E, the lower end of *k* is open.

The plates G G' work from a pin, *m*, as a centre, and it will be seen, from the above description, that the tube *k*, or hole *j*, in block C, constitutes a measure, and each time the plate G of the communication between the tubes *k l* and the lower end of *k*, is opened, the seed in *k* will be discharged.

The seed, as it drops from *k*, passes into a tube, H, which conducts it into the furrow made by the front plow or share *d*.

The capacity of this measure may be enlarged by withdrawing tube *k*.

The plates G G' are operated by a rod, I, connected to an arm, *n*, which projects from a shaft, J, fitted in the handles B B', said shaft J receiving its motion from the extreme end of the handle B', which works loosely on the end of a cross-rod, *e*.

The end of this pivoted part of B' has two plates, *o o*, attached, with curved slots, *p*, made in them, for the shaft J to pass through, and the outer end of J has an arm, *q*, extending from it, the outer end of which is pivoted to an arm, *r*, attached to the outer plate *o*, as shown clearly in fig. 1.

By moving this outer pivoted part of B', the seed-distributing device is operated at the will of the driver.

Having thus described my invention,

I claim as new, and desire to secure by Letters Patent—

1. The seed-dropping device, composed of the fixed block C, having an opening, *j*, through it, and the vibrating plates G G', provided respectively with the holes *g i*, arranged in relation with the pendent tube E of the hopper D, to operate in the manner substantially as and for the purpose set forth.

2. The pivoted outer part of the handle B', plates *o o*, arms *q r u*, shaft J, and rod I, for operating the seed-distributing device, all arranged substantially as shown and described.

his
      D. B.  ×  MORGAN.
          mark.

Witnesses:
B. H. RUSH,
W. J. BLOOMER.